United States Patent
Zhu et al.

(10) Patent No.: US 9,923,957 B2
(45) Date of Patent: *Mar. 20, 2018

(54) MULTIMEDIA AWARE CLOUD FOR MOBILE DEVICE COMPUTING

(71) Applicant: Microsoft Technology Licensing, LLC, Redmond, WA (US)

(72) Inventors: Wenwu Zhu, Basking Ridge, NJ (US); Lie Liu, Beijing (CN); Chong Luo, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/803,801

(22) Filed: Jul. 20, 2015

(65) Prior Publication Data

US 2015/0326649 A1 Nov. 12, 2015

Related U.S. Application Data

(63) Continuation of application No. 12/954,045, filed on Nov. 24, 2010, now Pat. No. 9,088,577.

(51) Int. Cl.
*H04L 29/08* (2006.01)

(52) U.S. Cl.
CPC ...... *H04L 67/1002* (2013.01); *H04L 67/1004* (2013.01)

(58) Field of Classification Search
CPC .................. H04L 67/1004; H04L 67/1002
(Continued)

(56) References Cited

U.S. PATENT DOCUMENTS

| 7,908,462 B2 | 3/2011 | Sung | |
|---|---|---|---|
| 2008/0205326 A1* | 8/2008 | Caradec | H04W 40/02 370/328 |

(Continued)

FOREIGN PATENT DOCUMENTS

WO    WO2010035281 A1    4/2010

OTHER PUBLICATIONS

Chappell, "Introducing Windows Azure," retrieved on Sep. 1, 2010 at <<http://www.davidchappell.com/writing/white_papers/Introducing_Windows_Azure_v1-Chappell.pdf>>, Microsoft Corporation, Technical Report, Mar. 2009, pp. 1-21.

(Continued)

*Primary Examiner* — Joseph L Greene

(57) ABSTRACT

Techniques for configuring and operating a multimedia aware cloud, particularly configured for mobile device computing, are described herein. In some instances, clusters of servers are organized for general computing, graphic computing and data storage. A load balancing server may be configured to: identify multimedia types currently being processed within the multimedia edge cloud; determine desired quality of service levels for each identified multimedia type; evaluate individual abilities of devices communicating with the multimedia edge cloud; and assess bandwidth of each network over which the multimedia edge cloud communicates with a mobile device. With that information, multimedia data may be adapted accordingly, to result in an acceptable quality of service level when delivered to a specific mobile device. In one example of the techniques, graphic computing server clusters may be configured to process workload using a configuration that includes elements of both parallel and serial computing.

19 Claims, 13 Drawing Sheets

(58) Field of Classification Search
USPC .......................................................... 709/219
See application file for complete search history.

(56) References Cited

U.S. PATENT DOCUMENTS

| | | | | |
|---|---|---|---|---|
| 2008/0263432 | A1* | 10/2008 | Newcomb | G06F 3/011 715/200 |
| 2009/0282093 | A1 | 11/2009 | Allard et al. | |
| 2010/0153838 | A1* | 6/2010 | Arnold | G06F 17/30899 715/234 |
| 2011/0061086 | A1* | 3/2011 | Huang | H04N 21/234309 725/110 |
| 2011/0088071 | A1 | 4/2011 | Yerli | |
| 2011/0282975 | A1* | 11/2011 | Carter | G06F 9/5055 709/220 |
| 2012/0131178 | A1 | 5/2012 | Zhu et al. | |

OTHER PUBLICATIONS

Cristina, "The new trend of Cloud Computing; with a special focus on the development of email services," retrieved on Sep. 1, 2010 at <<http://www.computeruser.com/articles/the-new-trend-of-cloud-computing-with-a-special-focus-on-the-development-of-email-services.html>>, ComputerUser Inc., White Paper, Jul. 16, 2009, pp. 1-4.

Office action for U.S. Appl. No. 12/954,045, dated Sep. 25, 2013, Zhu et al., "Multimedia Aware Cloud for Mobile Device Computing," 18 pages.

Office action for U.S. Appl. No. 12/954,045, dated Nov. 20, 2014, Zhu et al., Multimedia Aware Cloud for Mobile Device Computing,,18 pages.

Office action for U.S. Appl. No. 12/954,045, dated Feb. 28, 2014, Zhu et al., "Multimedia Aware Cloud for Mobile Device Computing," 19 pages.

Office action for U.S. Appl. No. 12/954,045, dated Apr. 15, 2013, Zhu et al., "Multimedia Aware Cloud for Mobile Device Computing," 18 pages.

Ranjan et al., "Decentralized Overlay for Federation of Enterprise Clouds," Department of Computer Science and Software Engineering, 38 pages.

Ranjan, et al., "Decentralized Overlay for Federation of Enterprise Clouds," retrieved on Sep. 1, 2010 at <<http://www.buyya.com/papers/schandbook-chap9.pdf>>, IGI Global, Handbook of Research of Scalable Computing Technologies, 2010, pp. 191-217.

Ranjan et al., "Peer-to-Peer Cloud Provisioning: Service Discovery and Load-Balancing," retrieved on Sep. 1, 2010 at <<http://arxiv.org/PS_cache/arxiv/pdf/0912/0912.1905v1.pdf>>, Springer, Cloud Computing: Computer Communications and Networks, 2010, pp. 195-217.

Satyanarayanan et al., "The Case for VM-Based Cloudlets in Mobile Computing," retrieved on Sep. 1, 2010 at <<http://www.sis.smu.edu.sg/research/diagram/Cloudlets-SATYA.pdf>>, IEEE Computer Society, PERVASIVE Computing, vol. 8, No. 4, Oct.-Dec. 2009, pp. 14-23.

Xu et al., "A Cloud Computing Platform Based on P2P", retrieved on Sep. 1, 2010 at <<http://ieeexplore.ieee.org/stamp/stamp.jsp?arnumber=05236386>>, IEEE International Symposium on IT in Medicine and Education, Aug. 2009, pp. 427-432.

Yim, "Decentralized Media Streaming Infrastructure (DeMSI): A Peer-to-Peer Content Delivery Network," retrieved on Sep. 1, 2010 at <<http://www.cloudbus.org/students/AlanMITThesis2004.pdf>>, The University of Melbourne, Australia, Master's Thesis, Nov. 2004, pp. 1-34.

* cited by examiner

MULTIMEDIA AWARE CLOUD FOR MOBILE DEVICE COMPUTING

RELATED APPLICATION

This application is a continuation of and claims priority to U.S. patent application Ser. No. 12/954,045, filed on Nov. 24, 2010, the disclosure of which is incorporated by reference herein.

BACKGROUND

Cloud computing is an emerging technology that provides a variety of services over a network, such as the Internet. Multimedia services and the use of mobile devices over wireless networks are increasing significantly. However, multimedia services, particularly when delivered over a wireless network to a mobile device having limited battery and processing power, are particularly challenging.

Multimedia presents significant quality of service (QoS) issues. In particular, audio/video content provided over a wireless network to a mobile device can experience delay, "jitter" or significant quality degradation, such as "pixilation." Such quality degradation can result from two primary sources: failures within the cloud and failures within the mobile device.

Failures within the cloud can include failure to fully utilize the capability and capacity of the cloud and its processing power. Failures within the mobile device include inherent limitations due to processing power, limited memory and limited battery power.

Accordingly, significant demand is developing in cloud computing, and mobile devices are a strong segment of that market. However, resolution of significant quality of service issues would help the market to achieve its full potential.

SUMMARY

Techniques for the configuration and operation of a multimedia aware cloud, particularly configured for mobile device computing are described herein. In one example, the multimedia aware cloud is configured as plural multimedia edge clouds, which may be geographically close to mobile devices communicating with the cloud, and which may be in communication with other multimedia edge clouds.

In one example, a multimedia edge cloud is configured to include clusters of servers that are organized for general computing, graphic computing and data storage. A load balancing server may be configured to: identify multimedia types currently being processed within the multimedia edge cloud; determine desired quality of service levels for each identified multimedia type; evaluate individual abilities of devices communicating with the multimedia edge cloud; and assess bandwidth of each network over which the multimedia edge cloud communicates with a mobile device. With that information, multimedia data may be adapted to result in an acceptable quality of service level when delivered to a specific mobile device. In one example of the techniques, a graphic computing server cluster may be configured to process workload using a configuration that includes elements of both parallel and serial computing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Figure 1:
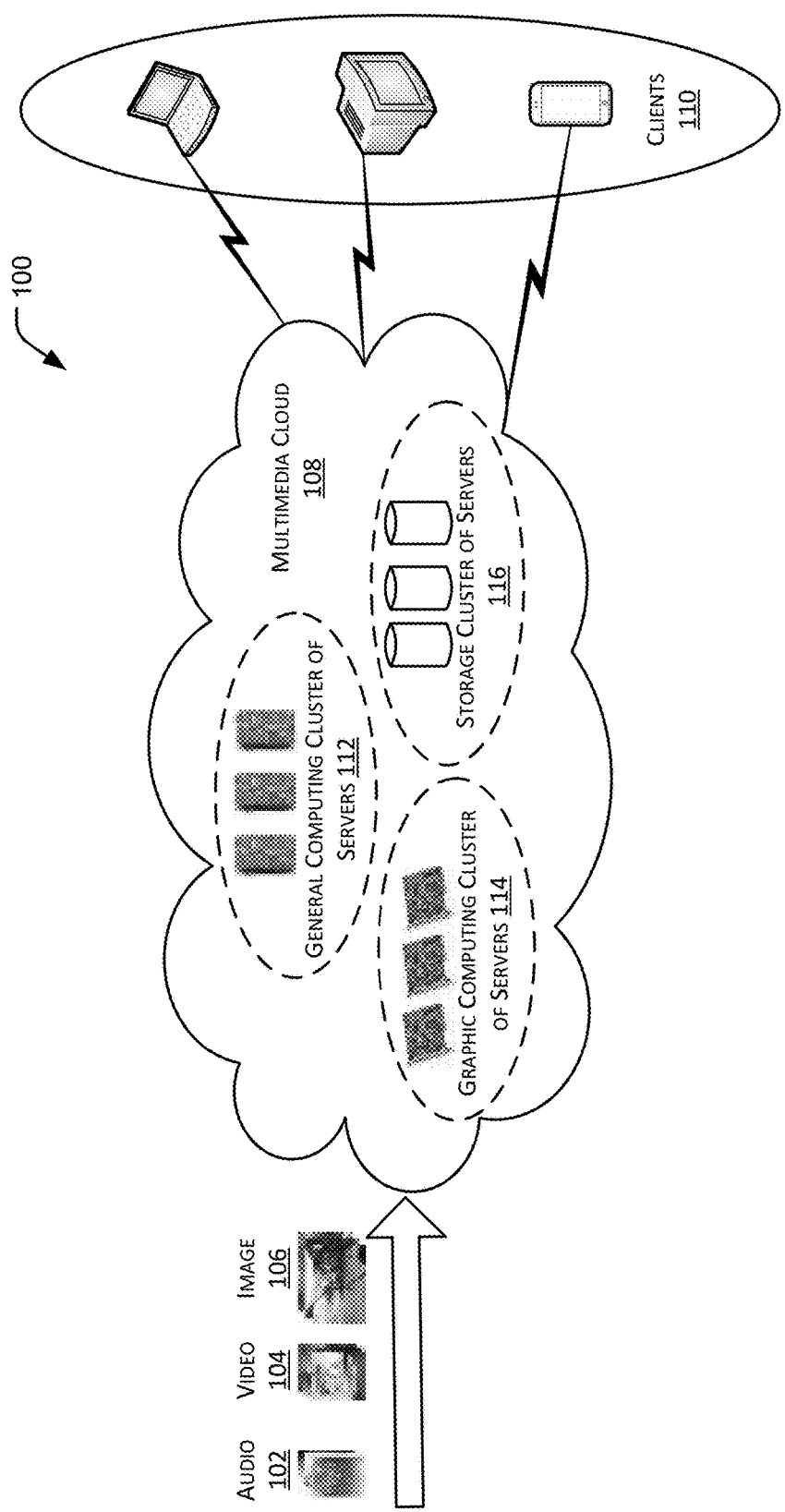
FIG. 1 is a diagram showing an example implementation of aspects of multimedia cloud computing, including segmentation of computing resources into general computing, graphic computing and storage clusters of servers.

Techniques for the configuration and operation of a multimedia aware cloud, particularly configured for mobile device computing are described herein. In one example, the multimedia cloud is configured as plural multimedia edge clouds (MEC). Each MEC may be geographically close to mobile devices communicating with the cloud and may be in communication with other multimedia edge clouds.

In one example, a multimedia edge cloud is configured to include clusters of servers that are organized for general computing, graphic computing and data storage. A load balancing server may be configured to: identify multimedia types currently being processed within the multimedia edge cloud; determine desired quality of service levels for each identified multimedia type; evaluate individual abilities of devices communicating with the multimedia edge cloud; and assess bandwidth of each network over which the multimedia edge cloud communicates with a mobile device. With that information, multimedia data may be adapted accordingly to result in an acceptable or desired quality of service level when delivered to a specific mobile device. In one example of the techniques, graphic computing server clusters may be configured to process workload using a configuration that include elements of both parallel and serial computing.

The techniques discussed herein improve network performance and the quality of service of multimedia content delivered to devices communicating with the network. In particular, media edge clouds are configured in local areas to provide connections to local terminals. Such connections handle huge transmissions of data that are effectively restricted to the local area. Accordingly, traffic over a backbone of larger networks (e.g., the Internet) is reduced to a great extent. Therefore, the clouds and multimedia edge clouds introduced herein reduce network delay and jitter, thereby improving quality of service over the Internet and wireless networks. Bandwidth consumption through operation of the clouds discussed herein is reduced, in part because of the efficient positioning of multimedia edge clouds with respect to end users. The disjoint nature of the multimedia edge clouds provide a potentially redundant design, which prevents bottleneck and single point of failure issues. Segmentation of CPU (central processing unit), GPU (graphic processing unit) and storage functionality within the multimedia edge clouds enhances throughput due to efficiencies of specialization. And further, support for heterogeneous devices, including "thin" mobile devices, is enhanced by operation of multimedia edge clouds configured to analyze device and network characteristics.

The discussion herein includes several sections. Each section is non-limiting; more particularly, this entire description illustrates components which may be utilized in a multimedia aware cloud for mobile device computing, but does not necessarily illustrate all components which are required. The discussion begins with a section entitled "Multimedia Clouds," which discusses several environments and examples, and particularly develops a high-level understanding of multimedia clouds. Next, a section entitled "Intra-Cloud Structures of Multimedia Edge Clouds" illustrates and describes example techniques for cloud implementation. A further section, entitled "Example Flow Diagrams," illustrates and describes techniques that may be used to operate a multimedia cloud and multimedia edge clouds. Finally, the discussion ends with a brief conclusion.

This brief introduction, including section titles and corresponding summaries, is provided for the reader's convenience and is not intended to limit the scope of the claims or any section of this disclosure sections.

Multimedia Clouds

FIG. 1 shows an example system 100, showing aspects of a multimedia cloud. The example system 100 includes multimedia content input, represented for purposes of example by audio content 102, video content 104 and image content 106. A multimedia cloud 108 is configured to process and provide the multimedia content to a plurality of clients 110, represented for purposes of example as a computing device, a television or large-screen display device and a mobile device.

In order to provide the clients 110 with a desirable level of quality of service, the multimedia cloud 108 is divided into clusters. In one example, the multimedia cloud 108 is configured to include a cluster of general computing servers 112, a cluster of graphic computing servers 114 and a cluster of storage servers 116. The heterogeneous multimedia services of multimedia cloud 108 allow diverse multimedia content to utilize a suitable portion of the cloud that is appropriately configured for efficient processing. In one example, the general computing cluster of servers 112 may provide services such as search engine operation, online retail, informational websites and other information to the clients 110. In a second example, the graphic computing cluster of servers 114 may provide services such as parallel arithmetic computing on a large scale, the streaming of motion pictures (movies), online gaming and other functionality involving higher-bandwidth data transmission and more graphic-rendering demands. And in a further example, the storage cluster of servers 116 may provide information storage services or back-up services for corporations or individuals. Accordingly, by providing such a division of labor among server groups, a more desirable level of quality of service may be achieved.

Figure 2:
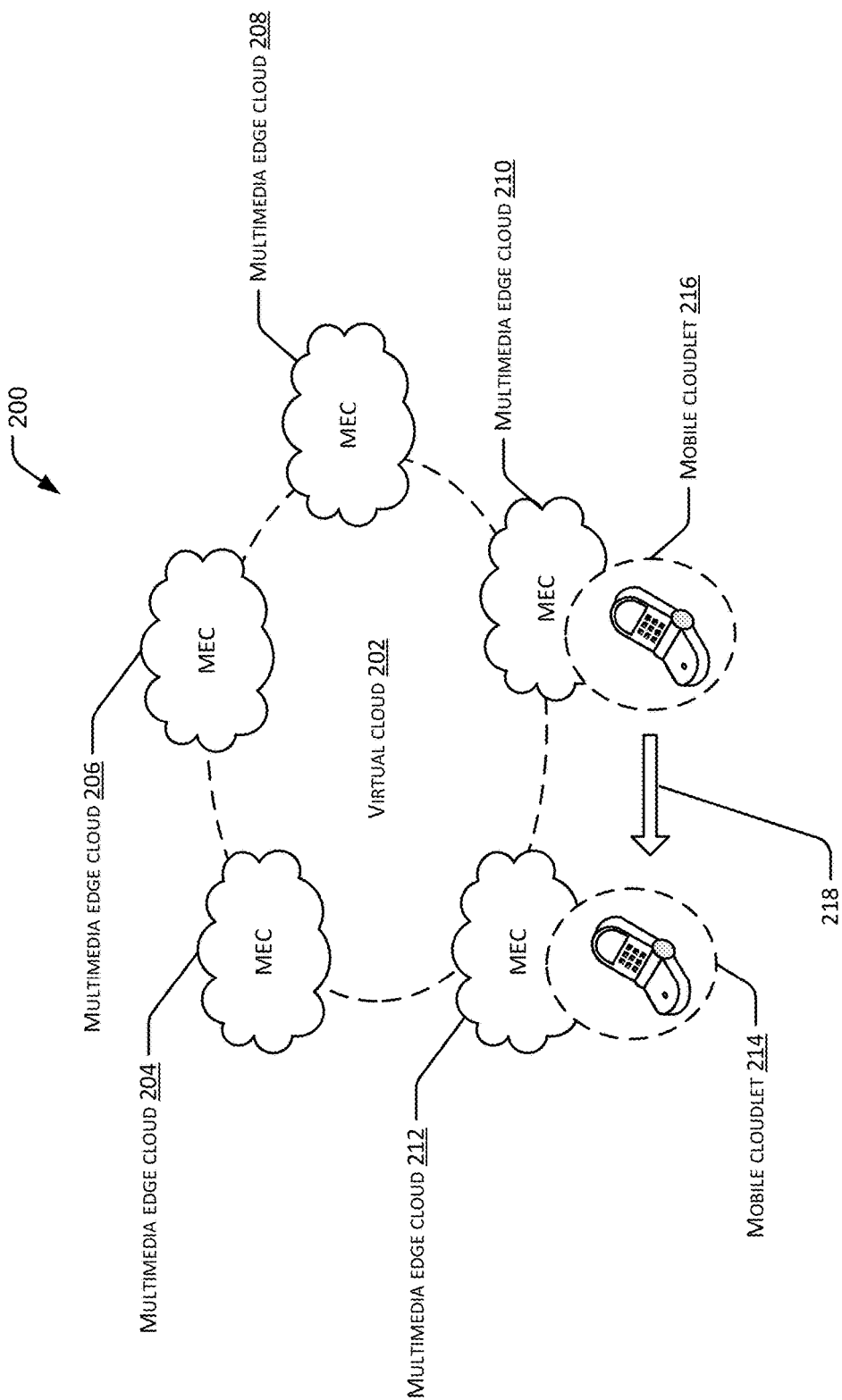
FIG. 2 is a diagram showing an example implementation of a multimedia cloud, wherein a plurality of multimedia edge clouds serves mobile devices.

FIG. 2 shows an example implementation a multimedia cloud 200. The multimedia cloud 200 includes a virtual cloud 202 and a plurality of multimedia edge clouds (MEC) 204-212. While five multimedia edge clouds are shown, any number of edge clouds could be configured and used. The virtual cloud 202 may project a unified and/or monolithic appearance of the multimedia cloud 200 to devices connected to the multimedia cloud. The unified appearance may be based in part on communication between multimedia edge clouds 204-212. As will be seen in FIGS. 2 and 3, the communication may be based on peer-to-peer, a central master or a combination thereof. Accordingly, the virtual cloud 202 is a generic configuration, representative of any number of configurations that provide a unified appearance of the multimedia cloud 200.

Each multimedia edge cloud 204-212 may be associated with a geographic area. By associating a multimedia edge cloud with a geographic area, the number, type or category and scale of various networks are reduced as a result. For example, multimedia edge cloud 204 is associated with geographic region 214. Accordingly, each multimedia edge cloud may provide wired and/or wireless service specifically tailored to a particular city or region. In one example, the multimedia edge clouds 204, 206, and 208 may be associated with Tokyo, Beijing and Los Angeles, respectively. By associating a multimedia edge cloud with a geographic area, many network, compatibility, and bandwidth issues are simplified. This is true in part because the number of networks and their diversity is reduced within the geographic area.

Each multimedia edge cloud 204-212 may have one or more mobile cloudlet, such as illustrated mobile cloudlets 216 and 218. A mobile cloudlet may provide structures and functionality to seamlessly integrate resources from both an edge cloud, with which the mobile cloudlet is associated, and a plurality of mobile devices. In operation, the mobile cloudlet may collaborate with an edge cloud and the plurality of devices to provide service to the plurality of devices. Thus, a mobile cloudlet may interface with a MEC and provide wireless service to one or more types of mobile devices. Data flow between mobile devices through a single multimedia edge cloud is simplified, and can be accomplished without utilization of resources from any other MEC. However, mobile devices associated with two different multimedia edge clouds may also communicate. In the example shown in FIG. 2, data flow 220 allows mobile devices associated with mobile cloudlets 216 and 218 to communicate.

Figure 3:
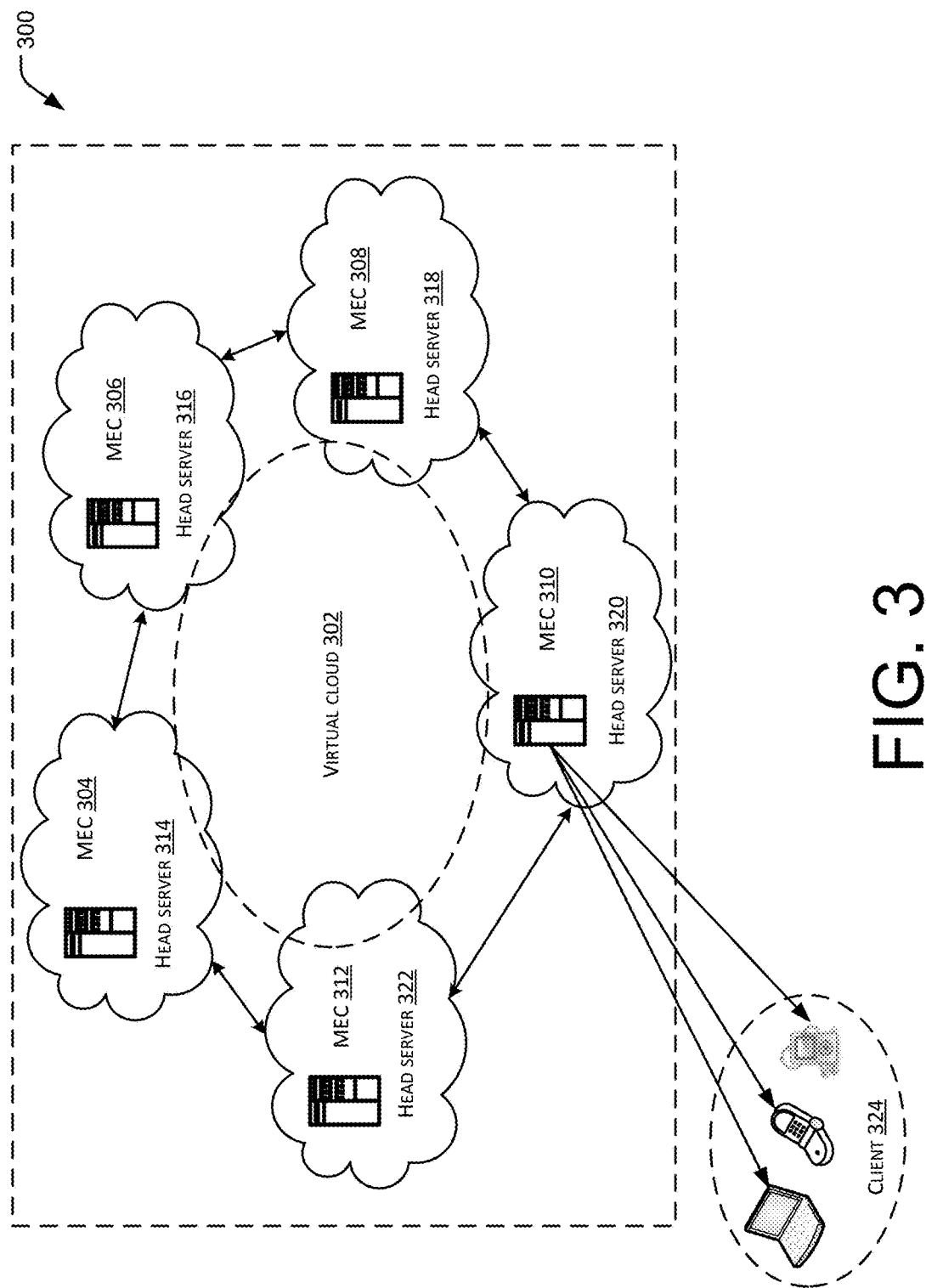
FIG. 3 is a diagram showing an example implementation of a multimedia cloud, wherein peer-to-peer communication is used between multimedia edge clouds.

FIG. 3 shows an example implementation a multimedia cloud 300. The multimedia cloud 300 includes a virtual cloud 302 and a plurality of multimedia edge clouds (MEC) 304-312. The virtual cloud 302 unifies the appearance of the multimedia cloud 300. Thus, clients attached to the multimedia cloud 300 may not be aware that the multimedia cloud is configured as a plurality of multimedia edge clouds 304-312.

Peer-to-peer communication between the multimedia edge clouds may be facilitated by a head server 314-322 located in each MEC. The peer-to-peer communication may involve communication among any two or more MECs. The peer-to-peer communication between the multimedia edge clouds may result in the virtual cloud 302 appearing as a unified cloud, not necessarily comprised of a plurality of MECs.

A plurality of clients 324 may communicate with each multimedia edge cloud 304-312. In some configurations, the clients 324 may be restricted to operation within wired or wireless networks within a particular geographic area. Accordingly, it is common for a multimedia edge cloud to serve terminals that are local to that MEC. However, if the MEC is overloaded, then a load balancing server or load balancing system (e.g., see FIGS. 6 and 7) may redirect requests for service to a neighboring MEC that has less computing workload and nearer to the terminal.

Figure 4:
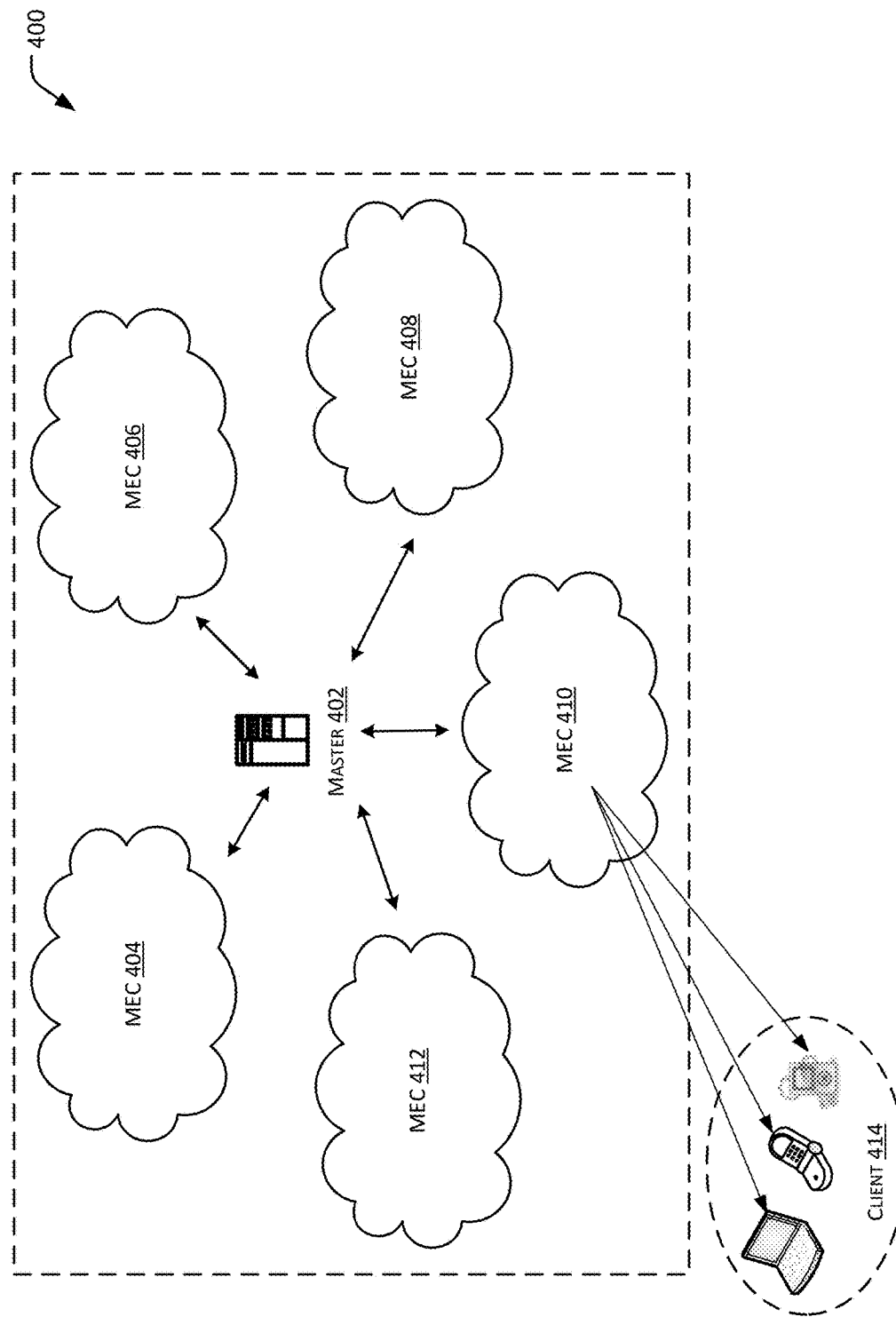
FIG. 4 is a diagram showing an example implementation of a multimedia cloud, wherein a central master server provides communication between multimedia edge clouds.

FIG. 4 shows an example implementation of a multimedia cloud 400 having a central master server 402. The master server 402 may provide communication between multimedia edge clouds 404-412. Accordingly, information having relationships to more than one geographic area may be easily transferred. Thus, each multimedia edge cloud 404-412 may provide wired or wireless communication to a plurality of clients 414, and facilitate information transfer to other MECs. In one example, the master server 402 may function as a router to find and/or facilitate communication between MECs. In order to avoid both a bottleneck and a single point of failure, the master can be configured as a "thin" system. For example, the master may comprise only a global list of MECs.

Figure 5:
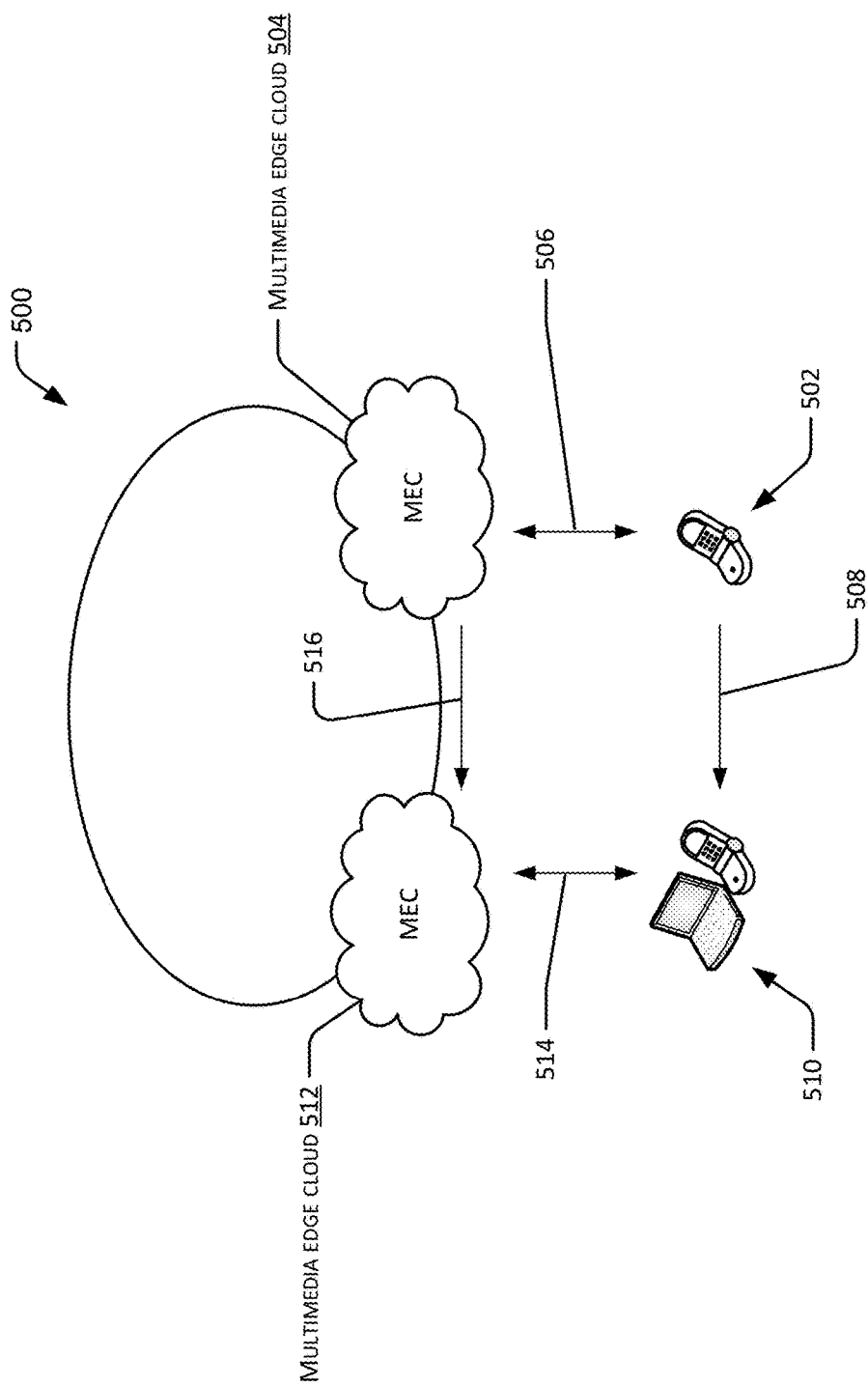
FIG. 5 is a diagram showing an example implementation of an aspect of context awareness of a multimedia edge cloud, wherein a mobile device transitions from one multimedia edge cloud to another.

FIG. 5 shows an example implementation of multimedia edge cloud 500 illustrating aspects of context awareness. In particular, one or more mobile devices 502 at a first geographic area 504 may be communicating with a particular multimedia edge cloud 506 over a wireless network 508. The multimedia edge cloud 506 may be associated with the first geographic area 504. The user may move one or more mobile devices, according to direction 510, to a second geographic location 512. At the new location 512, the devices will begin communication with a second multimedia edge cloud 514 over wireless network 516. Significantly, as the user moves from the first geographic area 504 to location 512, information, such as applications, data and a profile of the user, is transferred at 518 from the first multimedia edge cloud 506 to the second multimedia edge cloud 514. Due to this transfer, the user may experience a smooth transition between the two multimedia edge clouds. In particular, applications and other functionality of the user's devices may be unchanged.

Intra-Cloud Structures of Multimedia Edge Clouds

Figure 6:
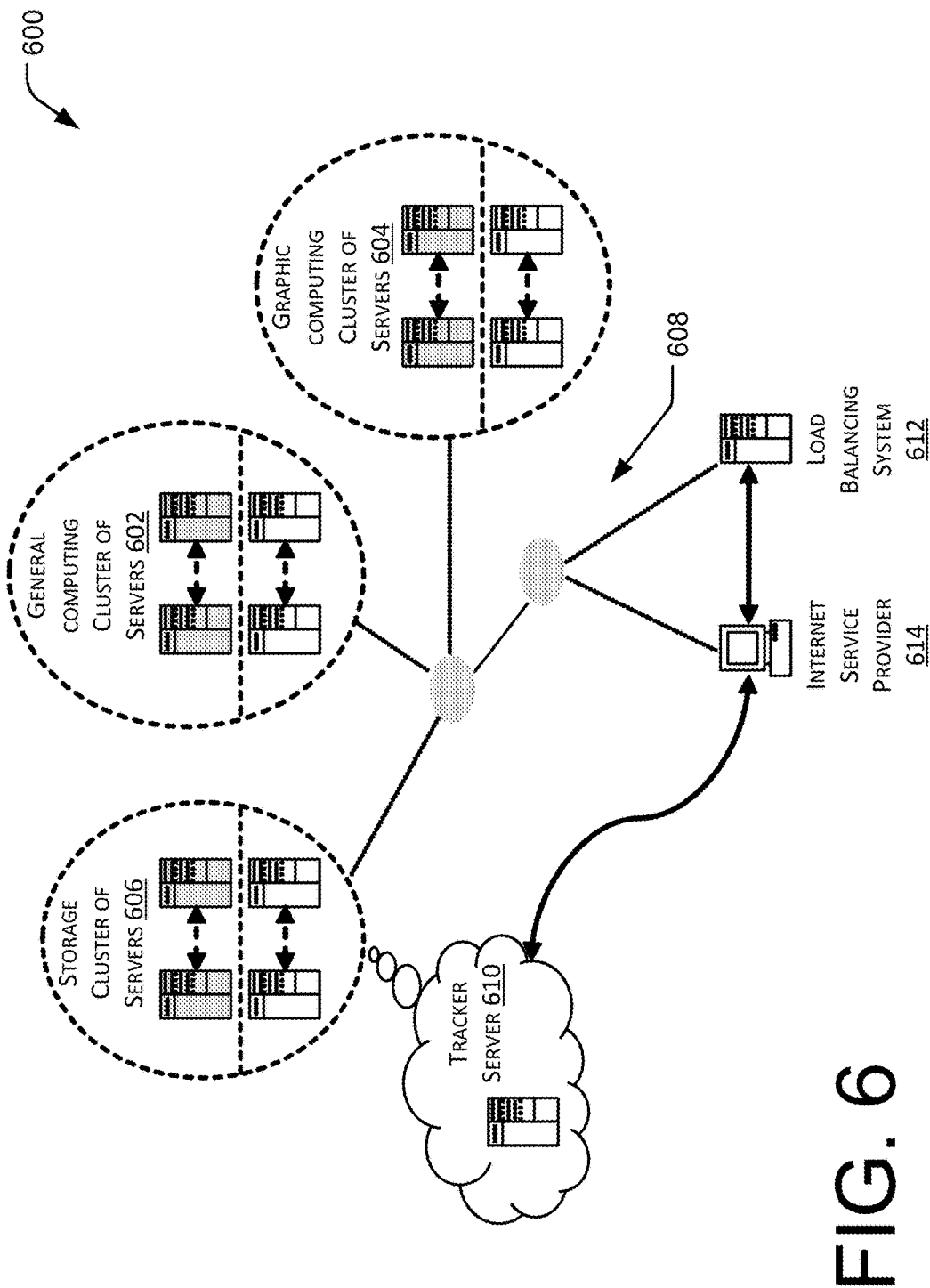
FIG. 6 is a diagram showing an example of structures within a multimedia edge cloud.

FIG. 6 shows an example of structures within a multimedia edge cloud 600. A plurality of servers have been configured to include a general computing cluster of servers 602, graphic computing cluster of servers 604, and a storage cluster of servers 606. The clusters of servers communicate over a network 608 within the multimedia edge cloud 600. A tracker server 610 is shown in communication with the storage cluster of servers 606. Optionally, similar tracker servers may be associated with the general computing cluster of servers 602 and graphic computing cluster of servers 604. Tracker servers "track" and/or manage programs and data within a specific server group. For example, tracker server 610 manages operation of the cluster of storage servers 606. A load balancing system or server 612 may communicate with clusters 602-606. The load balancing server 612 may manage workflow and load on the server clusters. In one example, the load balancing system may be deployed on a domain name system (DNS). Such a system could help terminals or clients 702 connected to a MEC to find the closest MEC that is not overloaded. An internet service provider 614 may communicate with the network 608 as well as the Internet (not shown), and provide access to numerous clients.

Figure 7:
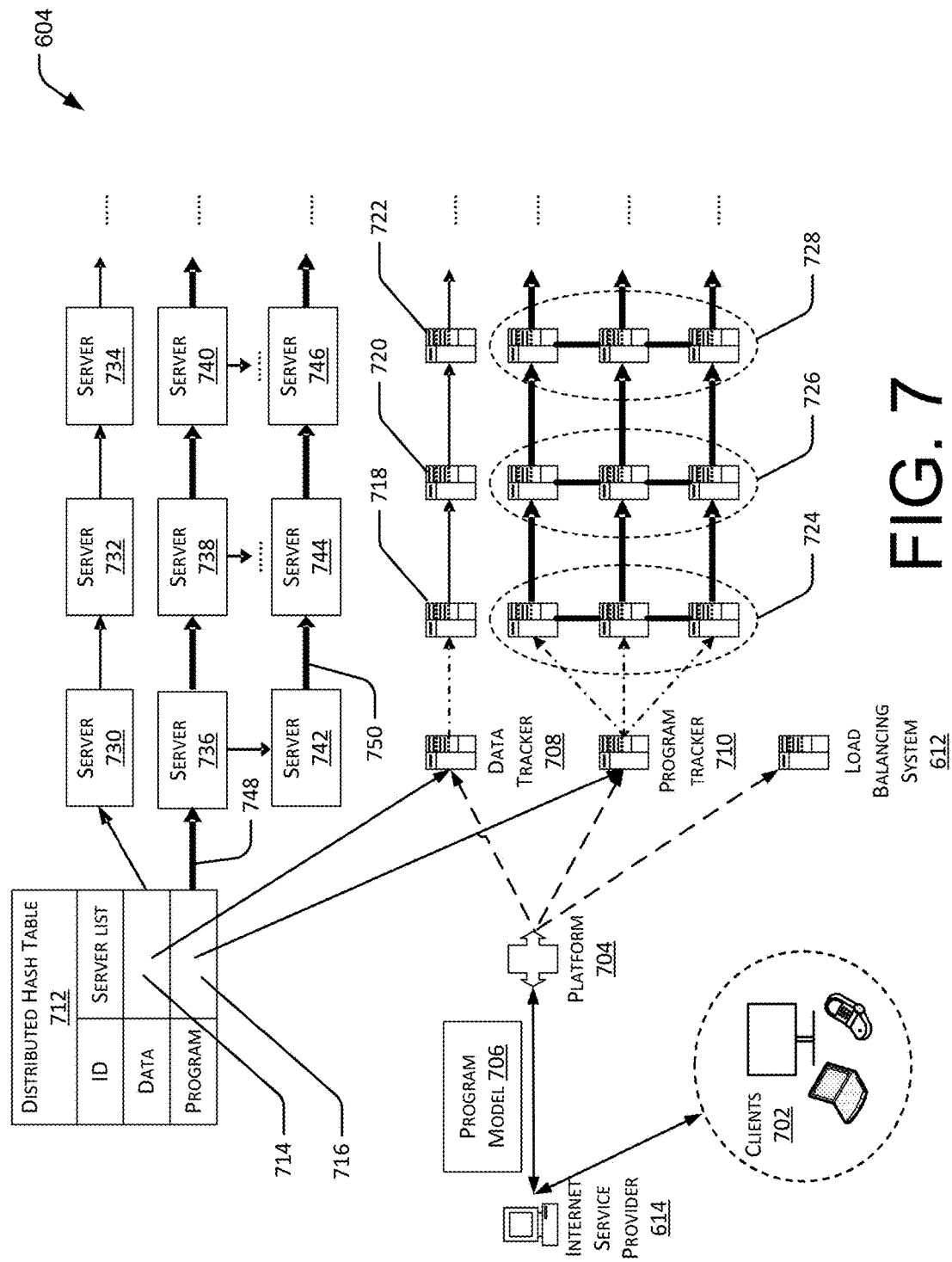
FIG. 7 is a diagram showing an example implementation within a multimedia edge cloud, including a distributed hash table and a processing structure having both parallel and pipeline structures.

FIG. 7 shows an example implementation of the graphic computing cluster of servers 604 seen in FIG. 6. While the example shown is intended for graphic or multimedia processing, a similar arrangement could be employed for other computing purposes, such as general computing, storage and others. The example implementation of the graphic computing cluster of servers 604 may include a distributed hash table supporting both data look-up and program look-up, and a processing structure having both parallel and pipeline characteristics.

An internet service provider 614 interfaces with a plurality of clients 702. The internet service provider 614 also communicates with a platform 704. In one example, the platform 704 may be an integrated development environment (IDE), and may provide comprehensive facilities to computer programmers for use in software development. An example of such an IDE is Microsoft's® Visual Studio®. The platform 704 communicates with the internet service provider (ISP) 614 using a protocol, structure and format based on a program model 706. In one example, the program model 706 may be a cloud SDK (software development kit), such as Microsoft's® Azure Services Platform® SDK. The platform 704 may construct infrastructure, while the program model 706 may provide an interface to the ISP 614. The platform 704 is seen in expanded form to the right, and includes a data tracker 708, a program tracker 710 and a load balancing server 612. Thus, in one example, the platform 704 is equipped with a mechanism to access the MEC. Such a mechanism may be transparent to the ISP 614.

The data tracker 708 and the program tracker 710 both reference a distributed hash table (DHT) 712. The DHT 712 provides both data look-up and also program look-up. Programs may be application programs, i.e., executable code. In particular, data look-up reference 714 is utilized by the data tracker 708, and program look-up reference 716 is utilized by the program tracker 710. In one example, the data tracker 708 tracks multimedia data, which is frequently referred to as "content." The program tracker 710 tracks executable programs, such as the programs that render video, format content and perform other functions related to multimedia content.

The data tracker 708 may provide data management over a plurality of servers, represented by example servers 718-722. These servers may be organized in a pipeline configuration. The program tracker 710 may provide program management over a plurality of graphic computing clusters of servers 724-728. Each cluster 724-728 provides parallel processing for complex graphic (e.g., multimedia) workloads. The parallel clusters 724-728 may be organized in a pipeline configuration. Thus, the servers 724-728 form a sequential pipeline of servers, wherein servers within a series of servers are grouped in parallel. Accordingly, aspects of both parallel and pipeline computing may be employed.

In one implementation, the distributed hash table 712 may provide data look-up references to a plurality of servers 730-734. Additionally, the distributed hash table 712 may provide program look-up references to a plurality of servers 736-746. A parallel link 748 and a pipeline link 750 may be utilized to provide both parallel and pipeline (e.g., series or sequential) processing (e.g., program operation and processing of multimedia content).

Figure 8:
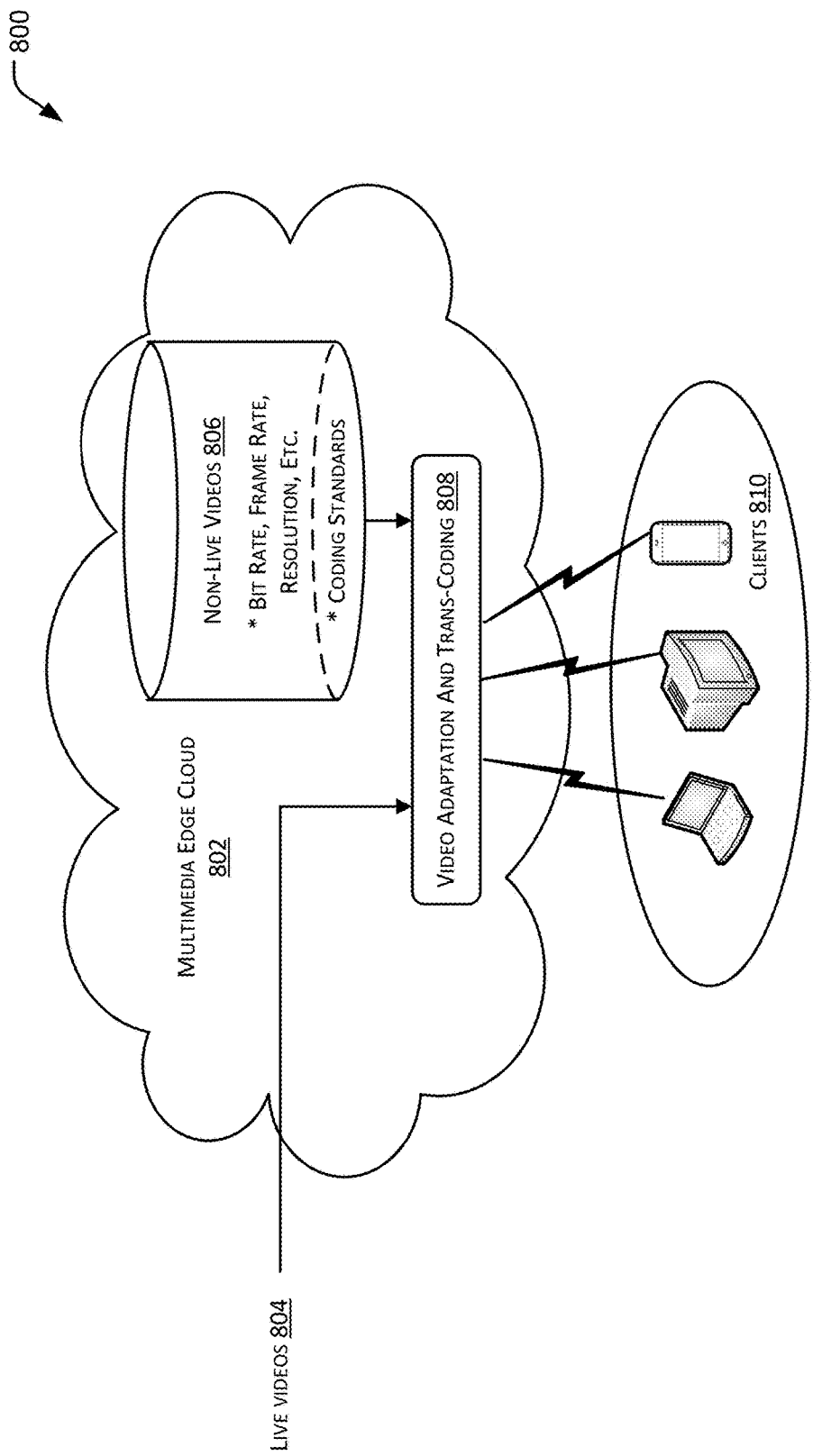
FIG. 8 is a diagram showing an example implementation of cloud-based video adaptation and trans-coding.

FIG. 8 shows an example implementation 800 of cloud-based video adaptation and trans-coding. In the example implementation of FIG. 8, a multimedia edge cloud 802 is configured to receive live video 804 and/or non-live video 806. The non-live video may be configured according to different bit rates, frame rates, resolutions and coding standards, etc. The multimedia edge cloud 802 is configured with sufficient processing power to enable video adaptation and trans-coding 808 to provide a plurality of clients with multimedia content adapted for display on different display devices associated with each client 810. For example, the video adaptation 808 may adapt multimedia content for display on a computer, a TV or a mobile device, etc. The adaptation may involve one or more of several factors. Example factors by which video and/or multimedia content may be adapted include (among other factors): alteration of resolution of the multimedia content; alteration of the image size; alteration of refresh rate; and/or alteration of a degree to which images of the multimedia content are rendered in the cloud 802, as opposed to on the client device 810.

Figure 9:
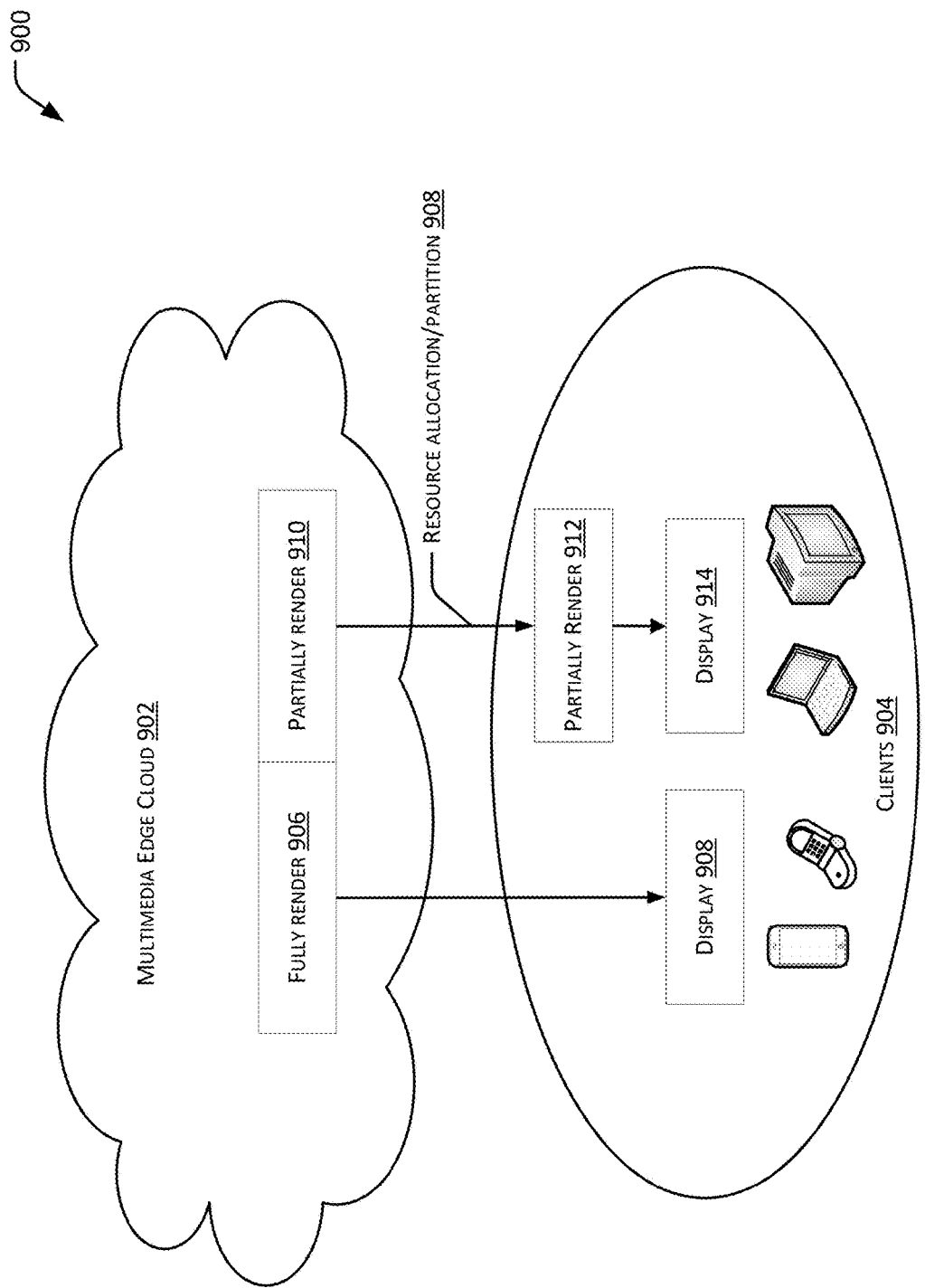
FIG. 9 is a diagram showing an example implementation of cloud-based multimedia rendering.

FIG. 9 shows an example implementation 900 of cloud-based multimedia rendering. A multimedia edge cloud 902 includes computing ability (e.g., resident in servers and appropriate software) for fully rendering or partially rendering multimedia content for display and/or utilization by clients 904. In particular, a rendering operation 906 fully renders multimedia content for display 908 on a screen of a "thin" client, e.g., a client having computing ability that may be insufficient to render and display the multimedia content without assistance. Such a client may be a mobile device having insufficient processing and/or battery power to perform full rendering. Alternatively, a rendering operation 910 within the cloud 902 may partially render multimedia content for transmission to a client 904 having greater computing resources. Such a client, e.g., a client having computing ability that is sufficient to partially render the multimedia content, may complete the rendering process by operation of a rendering operation 912 for display at 914. Such a client may be a computer or other device having insufficient processing power to fully render the multimedia content.

Example Flow Diagrams

FIGS. 10-16 are flow diagrams illustrating example processes for operating a multimedia aware cloud. The example processes of FIGS. 10-16 can be understood in part by reference to the configurations of FIGS. 1-9. However, FIGS. 10-16 contain general applicability, and are not limited by other drawing figures and/or prior discussion.

Figure 10:
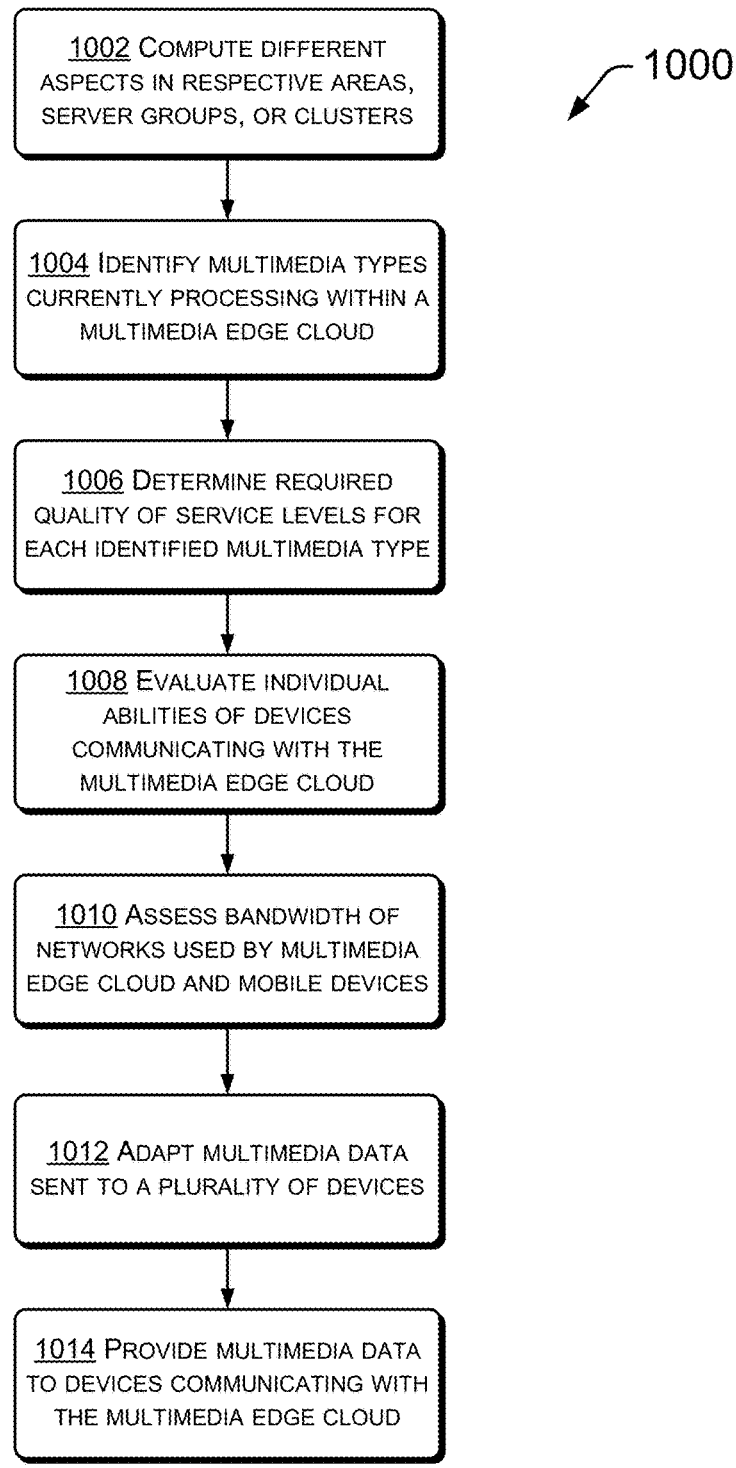
FIG. 10 is a flow diagram showing an example of multimedia edge cloud operation.

Each process described herein is illustrated as a collection of blocks in a logical flow graph, which represent a sequence of operations that can be implemented in hardware, software, or a combination thereof. In the context of software, the operations represent computer-executable instructions stored on one or more computer-readable storage media 1002 that, when executed by one or more processors 1004, perform the recited operations. Such storage media 1002, processors 1004 and computer-readable instructions can be located within a multimedia cloud (e.g., multimedia cloud 108 of FIG. 1) according to a desired design or implementation. More particularly, the storage media, processors and computer-readable instructions can be located within a cluster of graphic computing servers 604, as seen in FIGS. 6 and 7. The storage media 1002 seen in FIG. 10 is representative of storage media generally, both removable and non-removable, and of any technology, such as a DVD, CD, floppy disk, hard disk, tape or other media technology. Thus, the recited operations represent actions, such as those described in FIGS. 10-16, and are taken under control of one or more processors configured with executable instructions to perform actions indicated. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. The above discussion may apply to other processes described herein.

FIG. 10 is a flow diagram, showing an example 1000 of multimedia edge cloud operation. At operation 1006, different aspects of a workload or computing job are computed or processed in server clusters, server groups or respective portions within a cloud or a multimedia edge cloud. In one example, the multimedia edge cloud may process general computing, graphic computing and data storage within a general computing server group, a graphic computing server group, and a storage server group, respectively. In the example of FIG. 1, a multimedia cloud 108 is configured to include a general computing cluster of servers 112, a graphic computing cluster of servers 114 and a storage cluster of servers 116. Accordingly, the multimedia cloud 108 is divided into clusters or groups that compute different aspects of a workload in different portions of the multimedia cloud.

At operation 1008, multimedia types currently being processed within a multimedia edge cloud are identified. For example, multimedia types currently being processed within a cloud may include pictures, audio, video and multimedia mixtures, such as movies. Referring to the example of FIG. 7, the load balancing server 612 may be used to identify multimedia types, and to assign jobs or workloads based on the identified multimedia type. Accordingly, portions of a server or clusters of servers may be associated with particular types of multimedia data. Such multimedia data may be processed in sequential pipeline, parallel pipeline or hybrid manner, as seen in FIG. 7.

At operation 1010, a desired quality of service level for each identified multimedia type is determined. In one example, a movie would be assigned a higher quality of service level than a still picture, since interruption of rendering of the movie could result in serious degradation of the user's experience, while a slight delay in sending a photograph to a user may not even be noticed.

At operation 1012, individual abilities of devices communicating with the multimedia edge cloud are evaluated. In one example, the ability of devices to render video is evaluated. In the example of FIG. 9, some devices require full rendering of multimedia content (e.g. video), while other devices require only partial rendering of content. By evaluating individual abilities or capabilities of a device, the multimedia edge cloud can understand the needs of that device and accommodate those needs.

At operation 1014, bandwidth of networks used by a multimedia edge cloud and devices (e.g., mobile devices) is assessed. A number of devices may communicate with a multimedia edge cloud at any given time. The networks over which they communicate may be varied, and may include, for example, Wi-Fi networks, cellular phone wireless networks, and others. Such networks may have significantly different performance, which may impact the utility of multimedia content. Accordingly, by assessing the networks, limitations may be learned and an appropriate data processing and transmission plan devised.

At operation 1016, multimedia data (e.g., content) sent to a plurality of devices is adapted for each device. As one example, FIG. 9 shows that full rendering is provided for "thin" devices, while other devices having more processing power may require only partial rendering.

At operation 1018, multimedia data is provided to devices in communication with the multimedia edge cloud. The multimedia data may be adapted as indicated by operation 1016, according to factors determined by operations 1008-1014.

Figure 11:
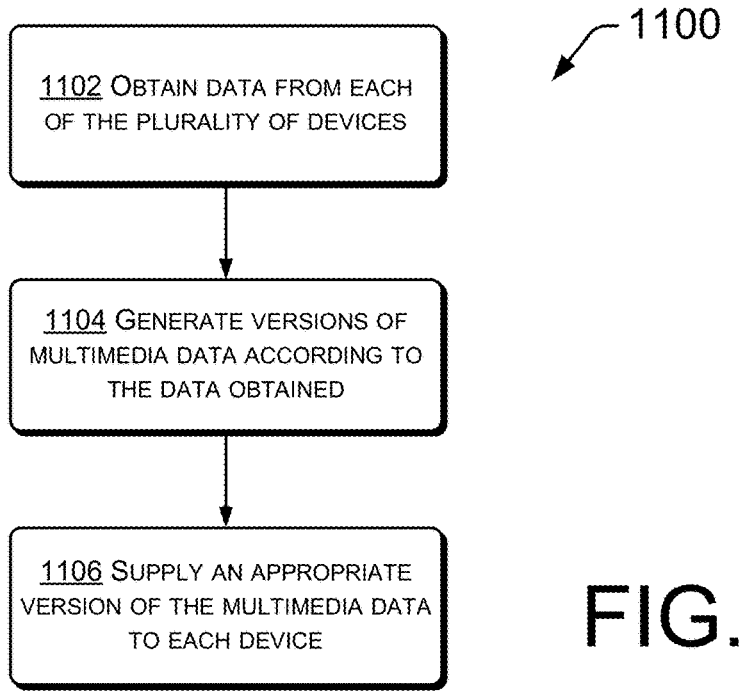
FIG. 11 is a flow diagram showing an example process by which multimedia data is adapted for use by a mobile device.

FIG. 11 is a flow diagram, showing an example 1100 by which multimedia is adapted for use by a mobile device. The adaptation may overcome deficiencies of the mobile device, such as inadequate processing ability to fully render multimedia input or an inadequate network connection for receiving a high-resolution version of the multimedia content. At operation 1102, data is obtained from one or more of a plurality of devices. The data may include data, information and/or parameters about the screen size, processor speed and/or network connection, etc., of a device. At operation 1104, one or more versions of the multimedia data is generated according to the data, information and/or parameters obtained from one or more mobile devices. At operation 1106, an appropriate version of the multimedia data is supplied or transmitted to each device.

Figure 12:
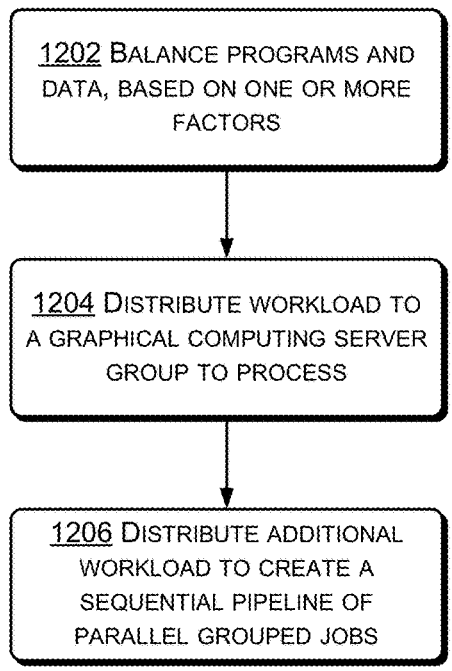
FIG. 12 is a flow diagram showing an example process by which a processing structure having both parallel and pipeline structures is operated.

FIG. 12 is a flow diagram, showing an example 1200 of operating a processing structure having both parallel and pipeline structures. At operation 1202, programs and data are balanced over servers or other processing assets, according to one or more factors. At operation 1204, workload is distributed to a graphic computing server group for processing. As seen FIG. 7, the processing of the graphic computing server group may include workloads (e.g., a workload distributed to servers 724) performed in parallel. At operation 1206, additional workload is distributed to the graphic computing server group, to create a sequential pipeline of workload processed in parallel. Referring again to the example of FIG. 7, a sequential pipeline is formed by the workloads 724-728, each of which is processed in parallel.

Figure 13:
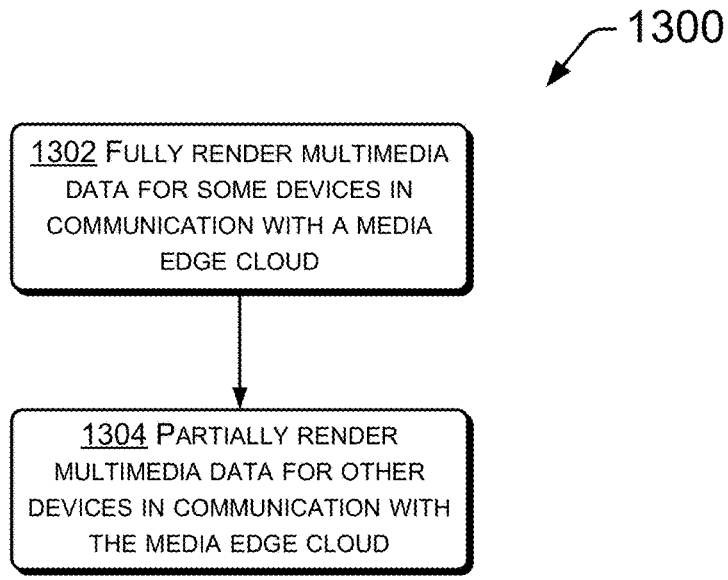
FIG. 13 is a flow diagram showing an example of multimedia cloud adaptation to different mobile devices, particularly those requiring different degrees of data rendering.

FIG. 13 is a flow diagram, showing an example 1300 of multimedia cloud adaptation to different mobile devices, particularly those requiring different degrees of data rendering. At operation 1302, multimedia data is fully rendered for some devices in communication with a media edge cloud. In the example of FIG. 9, multimedia data is fully rendered by operation 906 on the media edge cloud 902, for display at 908 on a "thin" device. At operation 1304, multimedia data is partially rendered for some devices in communication with a media edge cloud. In the example of FIG. 9, multimedia data is partially rendered within the multimedia edge cloud 902 at operation 910. The rendering of the multimedia data is then completed at operation 912 on a client device with greater processing ability, for display at 914.

Figure 14:
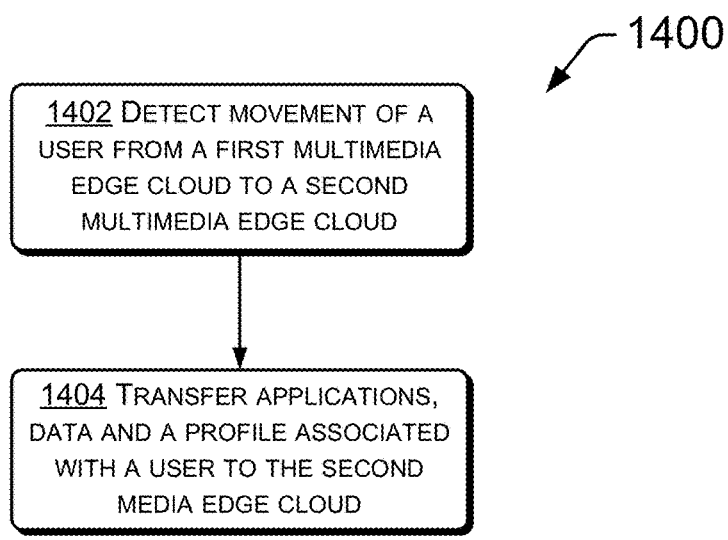
FIG. 14 is a flow diagram showing an example of multimedia cloud adaptation to different mobile devices, particularly showing operation of the multimedia edge cloud as a user transitions to a second multimedia edge cloud.

FIG. 14 is a flow diagram, showing an example 1400 of multimedia cloud adaptation to different mobile devices, particularly showing operation of the multimedia edge cloud as a device transitions to a second multimedia edge cloud. At operation 1402, movement of a device from a first multimedia edge cloud to a second multimedia edge cloud is detected. Multimedia edge clouds can be geographically defined, in that the clients of a particular multimedia edge cloud may be within a certain region, such as Beijing, China or Seattle, Wash. An association between a multimedia edge cloud and a geographic area tends to increase processing and network efficiencies. In the example of FIG. 5, a device 502 moves according to a direction 510 from a first multimedia edge cloud 506 to a second multimedia edge cloud 514. At operation 1404, applications, data and a profile associated with the user and/or device are transferred to the second multimedia edge cloud. In the example of FIG. 5, the transfer of applications, data and profile is seen at 518. Such a transfer provides a seamless transition in response to movement of the device 502 from a first multimedia edge cloud 506 to a second multimedia edge cloud 514.

Figure 15:
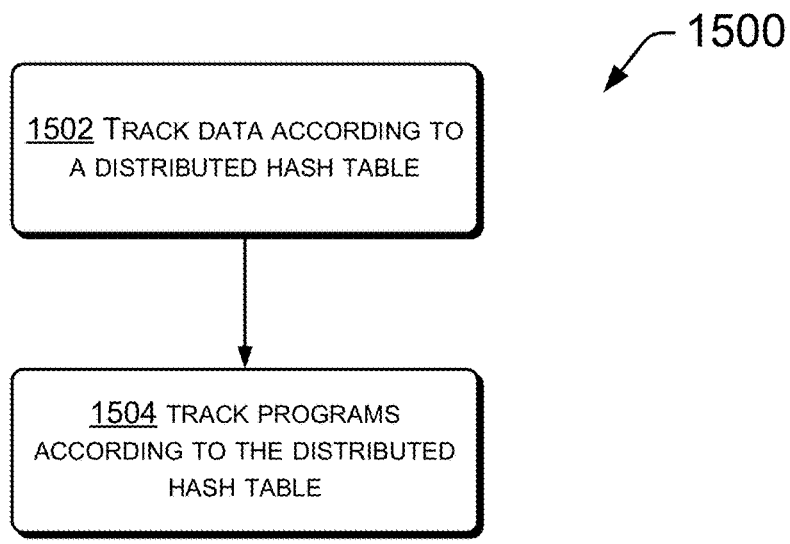
FIG. 15 is a flow diagram showing an example of hash table operation, wherein a hash table is used for tracking both programs and data configurations within a multimedia edge cloud.

FIG. 15 is a flow diagram, showing an example 1500 of hash table operation, wherein a hash table is used for tracking both program and data configuration within a multimedia edge cloud. At operation 1502, data are tracked, such as among a first plurality of servers on a multimedia edge cloud, according to a distributed hash table. At operation 1504, programs are tracked, such as among a second plurality of servers on a multimedia edge cloud, according to the distributed hash table. The operations 1502 and 1504 may be understood by reference to the example of FIG. 7. In one example, the load balancing system (LBS) 612 and the distributed hash table (DHT) 712 guide service requests by clients 702. In response to a request for service, the LBS 612 acts as a first guide, while the DHT 712 acts as a second guide. The LBS 612 may be deployed on a domain name server. In particular, when a terminal or client 702 requests a service, the LBS 612 responds by finding the closest available MEC that is not overloaded, and returns an entry. The entry may be used to allow the client 702 to run a query of the DHT 712 on the available MEC. The query may find trackers (e.g., data tracker 708 and program tracker 710) on the MEC associated with the entry. The trackers 708, 710 provide results for data and program, respectively. Thus, the LBS 612 returns the entry for an available, non-overloaded MEC, and the DHT returns the appropriate trackers within the MEC. The identified trackers 708, 710 manage servers (servers 718-728 in FIG. 7), which are directed to provide the required assistance to the terminals/clients 702.

Figure 16:
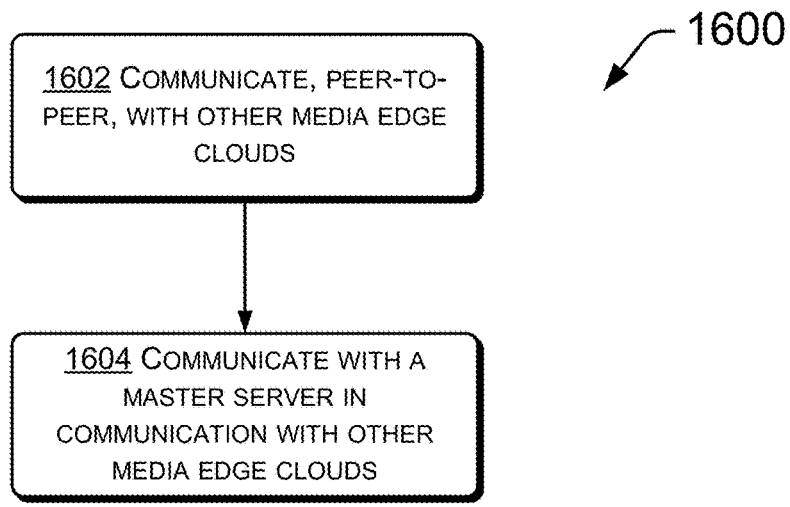
FIG. 16 is a flow diagram showing an example of alternative and/or complementary methods of communication between multimedia edge clouds.

FIG. 16 is a flow diagram, showing an example 1600 of alternative and/or complementary methods of communication between multimedia edge clouds. At operation 1602, peer-to-peer communication between multimedia edge clouds allows each multimedia edge cloud to communicate with one or more different multimedia edge clouds. Referring to FIG. 3, peer-to-peer communication is seen. In one example, a head server 314-322 in each multimedia edge 304-312 cloud facilitates communication. At operation 1604, a master server, located to allow communication with two or more multimedia edge clouds, facilitates communication across a cloud comprising a plurality of multimedia edge clouds. Referring to the example of FIG. 4, an example of a master server 402, facilitating communication with plural multimedia edge clouds 404-412, is seen. The master server 402 may be representative of a much larger and more complex server farm dedicated at least in part to communication across plural multimedia edge clouds. Referring to FIG. 2, the virtual cloud 202 indicates, among other things, that communication between multimedia edge clouds may be made by appropriate means, such as a combination or hybrid of the peer-to-peer system of FIG. 3 and the master server system of FIG. 4.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for mobile device computing, the method comprising:
   communicating, by a mobile device, with a first multimedia edge cloud of a multimedia cloud based on a first location of the mobile device, including communicating data corresponding to the mobile device, the data corresponding to the mobile device including information about device capabilities, parameters associated with the mobile device, and network connection information associated with the mobile device at a given time;
   receiving adapted multimedia content from the multimedia cloud via the first multimedia edge cloud, the adapted multimedia content configured and transmitted to the mobile device based at least in part on the communicated data corresponding to the mobile device;
   communicating with a second multimedia edge cloud associated with a second location in response to the mobile device moving from the first location to the second location; and
   continuing to receive the adapted multimedia content from the multimedia cloud via the second multimedia edge cloud, the multimedia cloud facilitating transfer of the data corresponding to the mobile device and applications associated with the mobile device between the first multimedia edge cloud and the second multimedia edge cloud in response to the mobile device communicating with the second multimedia edge cloud thereby providing a smooth transition relative to receiving the adapted multimedia content from the multimedia cloud and the applications and other functionality of the mobile device remain unchanged during the transfer.

2. The method of claim 1, wherein the multimedia cloud further assesses bandwidth of one or more networks over which the mobile device communicates the data corresponding to the mobile device to determine a multimedia content processing and transmission plan used to generate and transmit the adapted multimedia content to the mobile device.

3. The method of claim 1, wherein the adapted multimedia content is configured to include at least one of alteration of resolution of the multimedia content, alteration of image size of the multimedia content, alteration of a refresh rate of the multimedia content, or alteration of a degree to which images of the multimedia content are rendered in the multimedia cloud prior to transmission to the mobile device.

4. The method of claim 1, wherein the received adapted multimedia content is fully rendered at the multimedia cloud prior to transmission to the mobile device based on the communicated data corresponding to the mobile device, and further comprising:
   displaying the fully rendered multimedia content.

5. The method of claim 1, wherein the received adapted multimedia content is partially rendered at the multimedia cloud prior to transmission to the mobile device based on the communicated data corresponding to the mobile device, and further comprising:
   rendering the partially rendered adapted multimedia content to complete the rendering process for the received adapted multimedia content and generate fully rendered multimedia content; and
   displaying the fully rendered multimedia content.

6. The method of claim 1, wherein the mobile device is a thin client.

7. A system for mobile device computing, the system comprising:
   a plurality of mobile devices in communication with a multimedia cloud, individual devices of the plurality of mobile devices configured to:
      communicate individual device data with a first multimedia edge cloud of the multimedia cloud based on a first location of an individual device, the individual device data including information about individual device capabilities, parameters associated with the individual device, and network connection information associated with the individual device at a given time;
      receive individual multimedia content from the multimedia cloud via the first multimedia edge cloud, the individual multimedia content adapted at the multimedia cloud prior to transmission based at least in part on the communicated individual device data;
      display the received adapted individual multimedia content;
      communicate with a second multimedia edge cloud of the multimedia cloud in response to the individual device moving from the first location to a second location; and
      continue to receive the adapted individual multimedia content from the multimedia cloud via the second multimedia edge cloud, the multimedia cloud facilitating transfer of the individual device data and applications associated with the individual device between the first multimedia edge cloud and the second multimedia edge cloud in response to the individual device communicating with the second multimedia edge cloud thereby providing a smooth transition relative to receiving the adapted individual multimedia content from the multimedia cloud and the applications and other functionality of the individual device remain unchanged during the transfer.

8. The system of claim 7, wherein the multimedia cloud further assesses bandwidth of one or more networks over which the plurality of mobile devices communicates their respective individual device data to determine a multimedia content processing and transmission plan used to generate and transmit the individual multimedia content to the individual device.

9. The system of claim 7, wherein the individual device data includes information about screen size and processing speed of a corresponding individual mobile device.

10. The system of claim 7, wherein at least one mobile device of the plurality of mobile devices is a thin client, and wherein the individual multimedia content from the multimedia cloud received by the thin client is fully rendered at the multimedia cloud for display at the thin client.

11. The system of claim 7, wherein at least one mobile device of the plurality of mobile devices includes a processor configured for rendering operations, wherein the individual multimedia content from the multimedia cloud received by the at least one mobile device is partially rendered, and wherein the at least one mobile device is further configured to:
rendering the partially rendered individual multimedia content to complete rendering and generate fully rendered multimedia content for display.

12. The system of claim 7, further comprising:
a plurality of multimedia edge clouds associated with the multimedia cloud, the plurality of multimedia edge clouds corresponding to a plurality of geographically defined locations, wherein an individual multimedia edge cloud corresponds to an individual location.

13. The system of claim 7, further comprising:
at least one individual device of the plurality of mobile devices having reduced capabilities with respect to other capabilities of other individual mobile devices of the plurality of mobile devices.

14. One or more computer storage devices storing computer-executable instructions that, on execution by a computer, cause the computer to perform operations comprising:
communicating device data corresponding to a mobile device with a first multimedia edge cloud of a multimedia cloud based on a first location of the mobile device, the device data including information about device capabilities, parameters associated with the mobile device, and network connection information associated with the mobile device at a given time;
receiving adapted multimedia content at the mobile device from the multimedia cloud via the first multimedia edge cloud, the adapted multimedia content configured based at least in part on the communicated data corresponding to the mobile device;
communicating with a second multimedia edge cloud associated with a second location in response to the mobile device moving from the first location to the second location; and
continuing to receive the adapted multimedia content from the multimedia cloud via the second multimedia edge cloud, the multimedia cloud facilitating transfer of the data corresponding to the mobile device and applications associated with the mobile device between the first multimedia edge cloud and the second multimedia edge cloud in response to the mobile device communicating with the second multimedia edge cloud thereby providing a smooth transition relative to receiving the adapted multimedia content from the multimedia cloud and the applications and other functionality of the mobile device remain unchanged during the transfer.

15. The one or more computer storage devices of claim 14, wherein the multimedia cloud further assesses bandwidth of one or more networks over which the mobile device communicates the device data to determine a multimedia content processing and transmission plan used to generate and transmit the adapted multimedia content to the mobile device wherein the data corresponding to the mobile device includes at least one of information about device capabilities, parameters associated with the mobile device, and network connection information associated with the mobile device.

16. The one or more computer storage devices of claim 14, wherein the adapted multimedia content is configured to include at least one of alteration of resolution of the multimedia content, alteration of image size of the multimedia content, alteration of a refresh rate of the multimedia content, or alteration of a degree to which images of the multimedia content are rendered in the multimedia cloud prior to transmission to the mobile device.

17. The one or more computer storage devices of claim 14, wherein the received adapted multimedia content is fully rendered at the multimedia cloud prior to transmission based on the communicated data corresponding to the mobile device, and further comprising:
displaying the fully rendered multimedia content.

18. The one or more computer storage devices of claim 14, wherein the received adapted multimedia content is partially rendered at the multimedia cloud prior to transmission based on the communicated data corresponding to the mobile device, and further comprising:
rendering the partially rendered adapted multimedia content to complete the rendering process for the received adapted multimedia content and generate fully rendered multimedia content; and
displaying the fully rendered multimedia content.

19. The one or more computer storage devices of claim 14, wherein the mobile device is a thin client.

\* \* \* \* \*